July 8, 1969 P. R. AMLINGER 3,453,737

CIRCUIT DESIGN COMPUTER

Filed Dec. 13, 1966 Sheet 1 of 3

INVENTOR
P. R. AMLINGER

BY Fishman & Van Kirk

ATTORNEYS 3,453,737
CIRCUIT DESIGN COMPUTER
Philipp R. Amlinger, Bloomfield, Conn.
(1118 W. Rollins Road, Columbia, Mo. 65201)
Filed Dec. 13, 1966, Ser. No. 601,394
Int. Cl. G09b 29/10
U.S. Cl. 33—1 12 Claims

ABSTRACT OF THE DISCLOSURE

Apparatus for use in conformal mapping wherein circles passing through a common origin point may be displayed against a graphical background. The circles may be superimposed on the graphical background via transparent overlays having families of circles as indicia thereon or optical circle generator means may be employed to project the circles on a graphical background. Solution of problems is achieved by manipulating the overlays or adjusting the circle generators so as to make first and second circles tangent to selected lines which pass through the origin point on the graphical background.

The present invention relates to the solution of electronic circuit problems by analog techniques. More particularly, the present invention is directed to apparatus which facilitates the solution of problems involving complex polynomials to thereby enable the finding of a plurality of solutions to preset electrical filter circuit requirements. Accordingly, the general objects of the present invention are to provide novel apparatus of such character.

While not limited thereto in their utility, the disclosed embodiments of the present invention comprise devices which can solve problems, for example the rationalization of complex polynomials, which are common to all impedance operations. Accordingly, the present invention is particularly well suited for use in the design of electrical filter circuits and impedance transformers.

The design of electronic circuits is generally thought to require an intimate knowledge of various mathematical fields such as complex algebra, vector analysis, Fourier analysis, Laplace transforms, and the like. In other words, in order to design a filter circuit for a particular use, the engineer must be adept in working with complex variables. In the field of filter design, the required algebraic calculations which become daily practice for the engineer are quite cumbersome and boring and, unfortunately, are liable to inaccuracies due to the necessity of performing many slide rule operations. Modern day digital computers are poorly suited for solving problems of this nature because of the singularity of the solution produced. In the design of most electronic circuits, and particularly filter circuits, a number of numerical solutions are possible and; depending upon the components available, space and weight limitations, etc.; the optimum circuit will be selected for the particular use.

To recapitulate, the engineer working in the field of circuit design has been faced with a lack of suitable tools to facilitate his work, the necessity of making numerous hand calculations, and often inaccurate results from his work. In addition, in an attempt to simplify circuit design, the leading texts in the field have imposed unrealistic requirements (conditions) which have resulted in confining the designer to a singular solution. For example, it has been generally believed that some impedances cannot be matched with L-sections thus dictating the use of T-section filters. The use of the T-section filter permits the insertion of reactances in the series arms thus cancelling the reactive components of the source and load and leaving a resistance-to-resistance match which can be accomplished with a reactive L section. Following this teaching, four reactances would be obtained which may be combined into a T-section yielding two circuits, each having one numerical solution. According to the conventional teaching, this results in maximum energy transfer since conjugate impedances are obtained and no loss appears in the matching network. Conventional design technique also teaches that when a series of pure reactive coupling networks are placed in tandem between two impedances, and if at any junction the impedances looking both ways are matched (i.e. conjugates of each other), the impedances at all other junctions are automatically matched. This clearly states the need for conjugate matching, which is in contradiction to the requirement for minimum reflection; i.e., it ignores the phase difference between the source and load. This is an unrealistic simplification which restricts a designer or engineer following these teachings to a singular condition which excludes many possible solutions.

To again summarize, in view of the lack of mechanical aids to filter circuit design and the algebraic complexity of the design problems, refuge has previously been taken in nonrealistic simplifications and assumptions. These assumptions, which often are explained in terms of "deliberate mismatch," exclude many alternate designs which would meet the preset conditions.

The present invention comprises computation devices which may be placed on top of a desk or table and which, by graphical or conformal mapping techniques, provide an almost unlimited number of numerical solutions to circuit design problems. Thus, the underlying circuit theory which permits the apparatus of the present invention makes use of conformal mapping, also called complex geometry, which is a graphical method.

It is therefore an object of the present invention to solve complex algebraic equations rapidly and easily with mechanical means.

It is another object of the present invention to facilitate the design of electrical circuits.

It is also an object of the present invention to provide manually operable calculating devices which facilitate the rationization of complex polynomials.

It is yet another object of the present invention to provide calculating devices which present a visual solution to electrical filter circuit design problems.

It is a further object of the present invention to provide calculating devices which enable the rapid obtaining of a plurality of solutions to electrical circuit design problems.

These and other objects of the present invention are achieved by mechanizing the technique known as conformal mapping. A first embodiment of the invention comprises at least a first pair of transparent scales which pivot about a common point and which have suitable indicia imprinted thereon. This indicia comprises families of circles which are tangent to the pivot point. The pivot point is positionable at the origin of a suitable graph and, by proper manipulation of the scales and marking of the graph, solutions to problems may be rapidly determined.

A second embodiment of the present invention comprises a light box having means therein for projecting, adjusting and positioning at least a pair of circular images. These images are projected upon a screen which comprises a graphical background such that, by manipulation of the circle projecting means, solutions to problems may be rapidly derived.

The various advantages of the present invention will become readily apparent to those skilled in the art by reference to the accompanying drawing wherein like reference numerals refer to like elements in the various figures, and in which.

Figure 1:
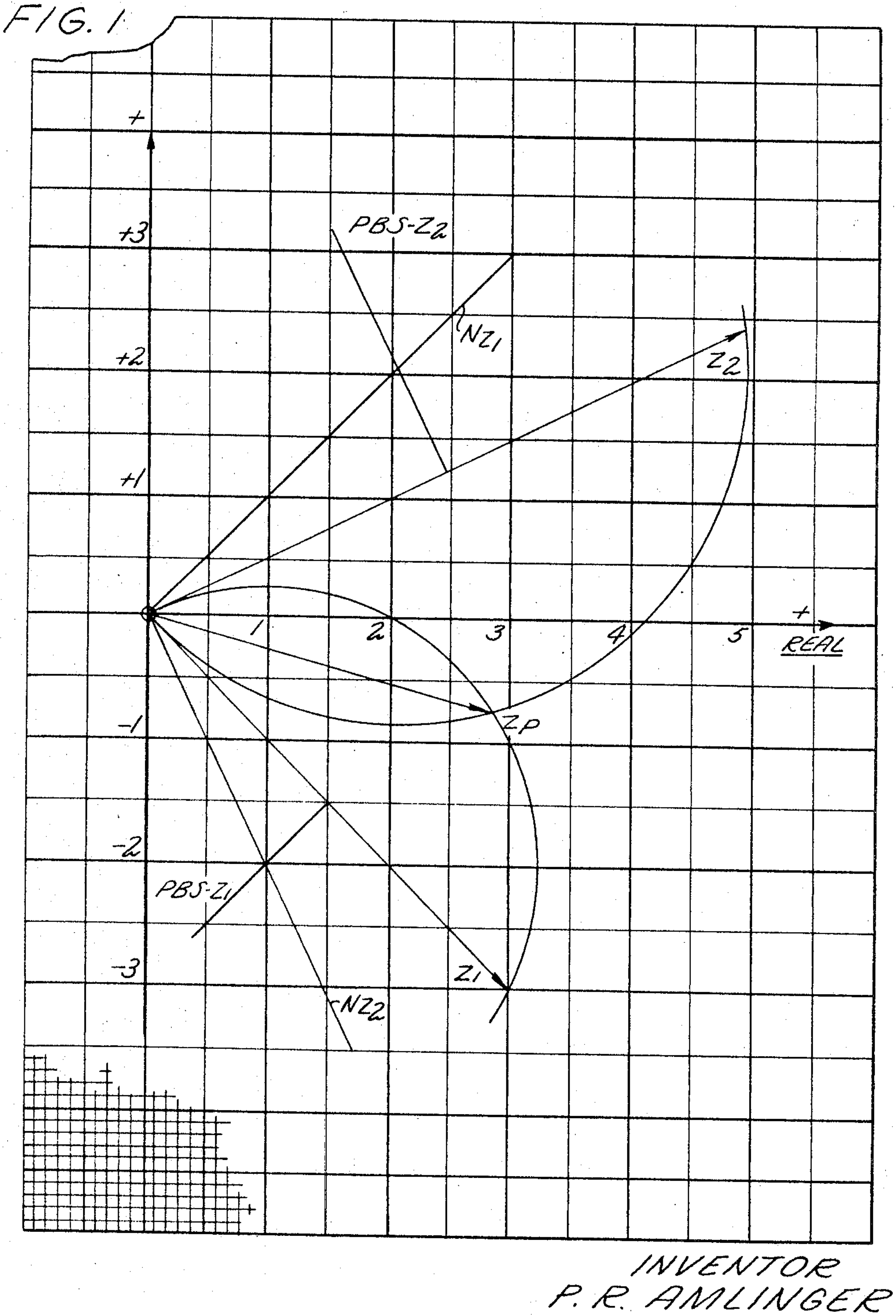
FIGURE 1 is an example of the technique known as conformal mapping.

FIGURE 1 represents the graphical solution of the algebraic equation for two impedances in parallel. The two impedances may be represented by two impedance vectors, Z1 and Z2, in the complex plane. Considering, for example, a situation where:

$$Z1=3.0-j3.0$$
$$Z2=4.9+j2.4$$

The graphical solution is obtained by first drawing both impedance vectors. Next, the perpendicular bisector on each vector is drawn. On FIGURE 1 these perpendicular bisectors are respectively labelled PBS–Z1 and PBS–Z2. Next, the normals to each vector at the point of origin are constructed. These normals are respectively shown at NZ1 and NZ2. The intersection of PBS–Z2 and NZ1 thus becomes the center of a circle trough the end of the Z2 vector and tangent to the Z1 vector at the point of origin O. Similarly, the point of intersection of PBS–Z1 and NZ2 comes at the center of a circle through the end of impedance vector Z1 and tangent to vector Z2 at the origin. The intersection of the two circles thus drawn is the graphical solution of the following equation.

$$(1)\qquad Z_D=\frac{Z_1Z_2}{Z_1+Z_2}=\frac{(R_1\pm jX_1)(R_2\mp jX_2)}{(R_1+R_2)\pm j(X_1\mp X_2)}$$

where the values of Z1 and Z2 are as given above. This solution may be readily read from FIGURE 1 yielding:

$$Z_P=2.83-j0.73$$

The above-described graphical solution to an impedance problem is, of course, an extremely simple example. For a comprehensive treatment of the matter of the solution of impedance problems via graphical techniques, reference may be had to the paper entitled "The Unrecognized Potential of Graphical Circuit Design" presented by the present inventor at the National Electronics Conference in Chicago, Ill. on Oct. 3, 1966, and reprinted at pages 916–921 of volume 12 of the Proceedings of the National Electronics Conference. Accordingly, the present inventor's above-referenced paper is incorporated into the present disclosure by reference.

Figure 2:
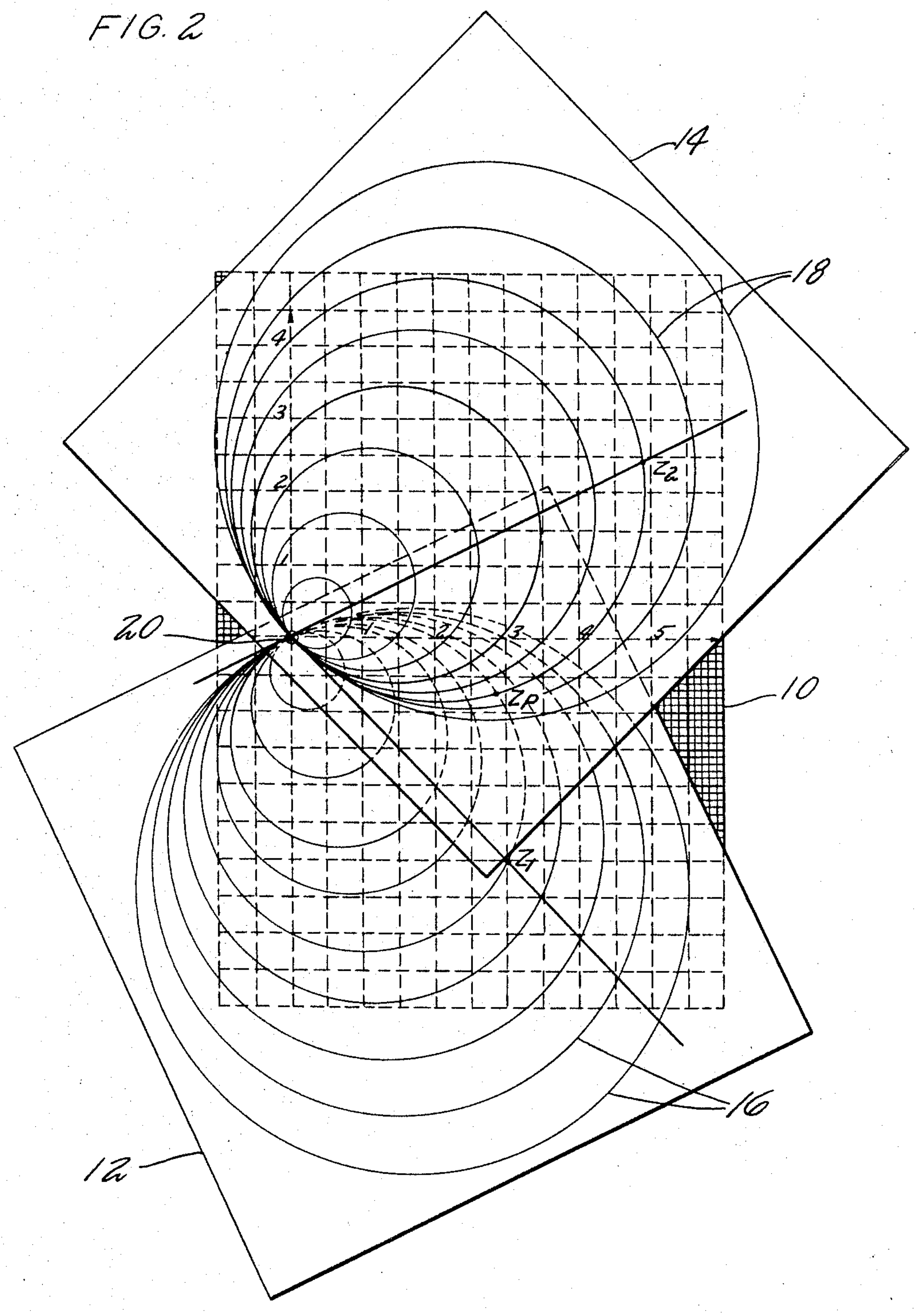
FIGURE 2 is a top view of a first embodiment of the present invention.
Figure 3:
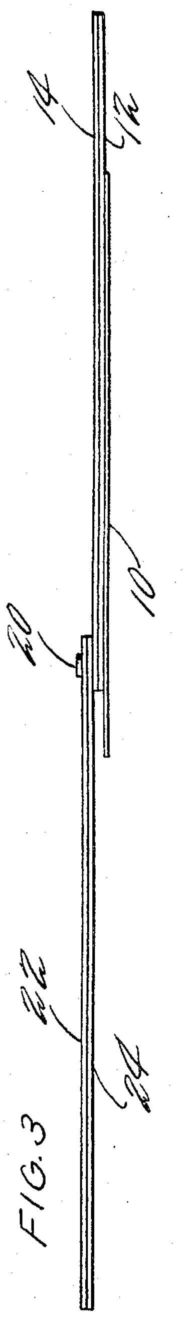
FIGURE 3 is a side view of the embodiment of FIGURE 2.

While, as indicated by the present inventor's above-referenced paper, the graphical solution of impedance problems encompasses an unrecognized potential, it is nevertheless desirable to provide mechanical tools to facilitate such solutions. A first embodiment of such a tool is shown in FIGURES 2 and 3. The physical structure of the embodiment of FIGURES 2 and 3 comprises a linear graph sheet 10 and two transparent scales 12 and 14.

Scales 12 and 14 are interconnected at the point of tangency of the families of circles on each by means of a pivot 20 representing the point of origin O. Each of scales 12 and 14 is thus movable with relation to the other scale and with relationship to graph sheet 10. Graph sheet 10 may, if desired, also be affixed to pivot 20, the pivot passing through the point of intersection of the X and Y axes selected on the graph. Alternately, pivot 20 may have a sharp point at one end so as to enable the pivotably mounted scales to be affixed against sheets of graph paper. If desired, a base plate may be provided with the pivot being adapted to be passed through the base of a plate and locked beneath the plate. In this manner, once a graph paper has been installed on the base, the danger of the pivot point 20 being moved during a calculation is obviated.

The embodiment of FIGURES 2 and 3 may be used as a vector slide rule for circuit impedance calculations. For example, in one application the points Z1 and Z2, corresponding to the ends of impedance vectors in a vectoral representation of parallel impedances, are located on graph 10. If the graph 10 is a permanent part of the apparatus, points Z1 and Z2 may be marked with an erasable crayon. Next, scale 12 is pivoted so that its family of circles is tangent to the Z2 vector as shown. Similarly, scale 14 is pivoted so that its family of circles is tangent to the Z1 vector as shown. The point of intersection of the circle passing through point Z2 with the circle passing through the point Z1 is the value $Z_P$ of the equivalent impedance of the parallel impedances Z1 and Z2.

The foregoing example demonstrates the solution of the problem wherein two impedances of any phase angle are connected in parallel. The graphical solution is the intersection of two circle loci. The solution of the impedance problem is arrived at rapidly, easily and with great accuracy. To arrive at the same solution algebraically, by the rationalization of the above-expressed simple complex polynomial (Equation 1), requires about a dozen multiplications and/or divisions with the aid of a conventional slide rule and six additions and/or subtractions.

It is also noteworthy that, when the present invention is employed in the design of filters, an additional advantage is derived. The above-referenced paper of the present inventor describes how, by graphical techniques, additional solutions not previously presented in the literature by algebraic techniques, may be readily found for filter design problems. These additional solutions are readily visible to the designer employing the present invention and he thus has at his fingertips multiple solutions to filter design problems enabling the optimum solution commensurate with the environment to be selected.

While FIGURE 2 shows apparatus employing only two scales 12 and 14, it is to be understood that, as shown in FIGURE 3, any number of additional scales, such as scales 22 and 24, may be interconnected by pivot 20. Each scale would, of course, carry indicia in the form of a family of circles. By employing a plurality of scales, high accuracy and easy readability are assured since each individual scale need have only a few well spaced circles thereon.

Figure 4:
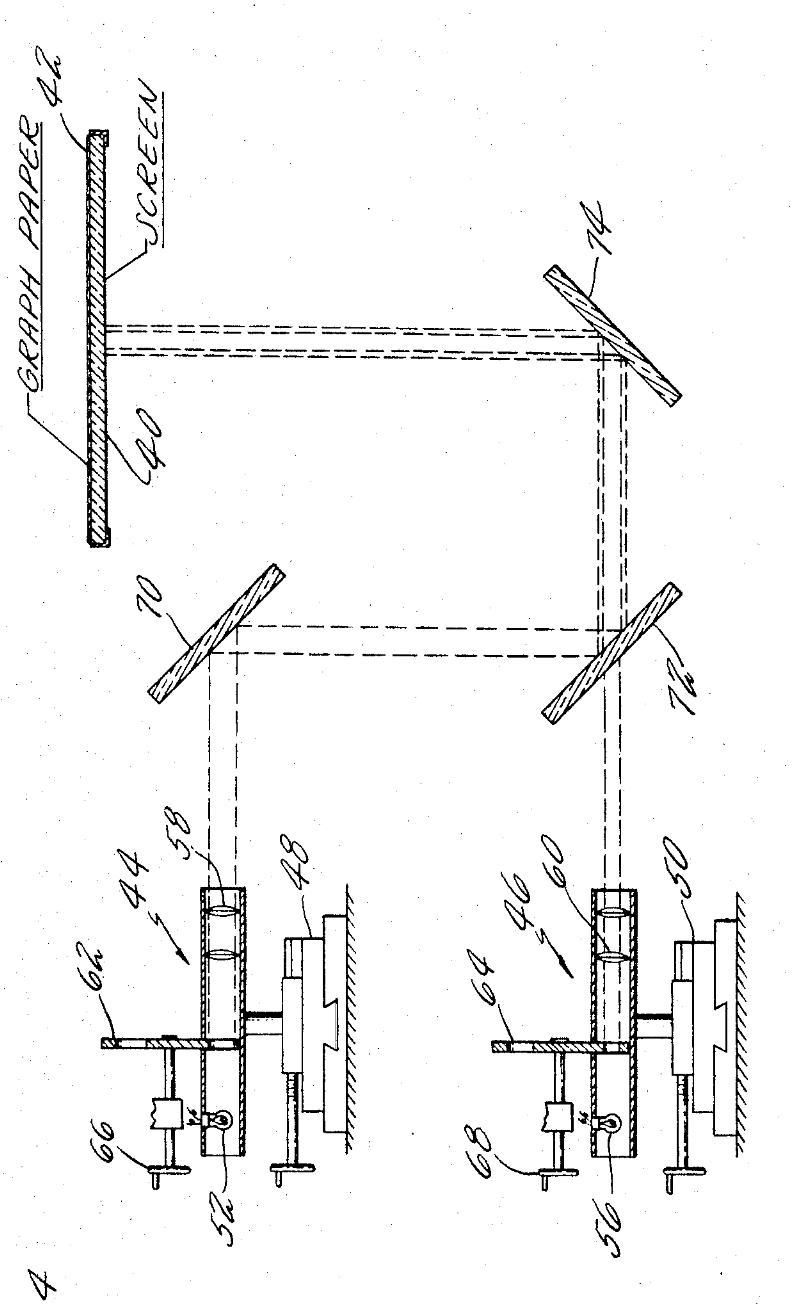
FIGURE 4 is a side view of the second embodiment of the present invention.

Referring now to FIGURE 4, a second embodiment of the present invention is shown. The embodiment of FIGURE 4 comprises a light box, not shown, having a glass screen 40 onto which are projected a pair of circular images. Screen 40 may be completely clear or it may have indicia in the form of a graph printed thereon by a technique such as silk screening. A piece of translucent paper 42 is positionable upon screen 40. In the usual instance, paper 42 will be a graph paper through which the images projected on screen 40 may be seen. If, however, screen 40 has a graph imprinted thereon, paper 42 may be without markings. The circular images projected on screen 40 are generated by a pair of circle generators indicated generally at 44 and 46 and physically located within the light box. Generators 44 and 46 respectively comprise XY tables 48 and 50 which enable the position of the circular images formed thereby to be moved with respect to screen 40. The actual circular image generating means of generators 44 and 46 respectively comprise light sources 52 and 56, projection lens systems 58 and 60 and rotatable masks 62 and 64. Masks 62 and 64 have a plurality of circles of different size cut therein and, by means of handles 66 and 68, the desired size circular mask portion may be positioned between the light source and projecting lens of the circle generator. The circular image formed by generator 44 is reflected onto screen 40 via mirrors 70, 72 and 74. Mirror 72 is partially reflective and the image generated by circle image generator 46 is thus passed through mirror 72 and is reflected onto screen 40 by mirror 74. Accordingly, two circles of the same or different sizes may be projected on screen 40 and these two circles may be positioned as desired; for example so as to be tangent to the point of intersection of the X and Y axis selected on the graph paper 42. The graph paper, may of course, be suitably marked so as to permit the rapid solution of design problems in the same manner as accomplished employing the embodiment of FIGURES 2 and 3.

The embodiment of FIGURE 4, enables the obtaining of a plurality of solutions to most circuit design problems in the same manner as the embodiment of FIGURES 2 and 3. In either case, the procedure of operation of the present invention is the same. Presuming, for example, it is desired to design a conjugately matched, reactive, low pass T transformer, the computers of the present invention would be operated as follows:

(1) Indicate the known terminating impedances Z1 and Z2 and their conjugates on the display. (The vector end points of the impedances and their conjugates are respectively indicated by dots and asterisks on analog display.)

(2) Select the desired circuit configuration and indicate on the display. (In the T reactive transformer example being discussed, vertical lines through Z1–Z1* and Z2–Z2* will be displayed by drawing on the paper.)

(3) Indicate the desired frequency characteristic of the circuit on the display. (This is accomplished with "action arrows" which, in the case of a low pass circuit, will be placed on the vertical lines displayed in step 2; the arrows pointing vertically upwards, away from Z2 but towards Z1*, or vice versa.)

(4) Perform the initial computation by fitting or displaying a first circle which is tangent to the Y (imaginary) axis at the origin of the display and which passes through the vertical Z2–Z2* line at any preselected "stop" point. The values of reactances X1 and X2 are readable off the display from the points of intersection of the first circle with the extended ends of the vertical lines. Then:

(a) draw line through the origin and the intersection of the extended Z2–Z2* vertical line with the first circle, (b) project or fit a second circle on the display tangent to the line drawn in step (4)a and passing through the point of intersection of the extended Z1–Z1* line with the first circle as well as the origin. The intersection of this second circle with the Y (imaginary) axis gives the value for $X_p$.

(5) Compute alternative numerical values by increasing the length of the Z2–Z2* vertical line and fitting or projecting new circles through the arbitrarily selected "stop" points.

(6) Compute values of components of alternative circuits. For a high pass T, for example, the action arrows would be reversed.

The several possible frequency characteristics and circuit configurations (i.e.; low passes, high passes, band passes in L, T and TT circuits) and the required movements of the "action arrows" when designing such circuits with the aid of the analog computers of the present invention are detailed in the present inventor's above-referenced paper. Bandstop and iterative networks are simply obtained by adding more elements.

While preferred embodiments have been disclosed, it is to be understood that various modifications and substitutions may be made thereto without departing from the spirit and scope of the present invention. Accordingly, it is to be understood that the present invention has been described by way of illustration and not limitation.

What is claimed is:

1. A calculating device comprising:
graphical background means, said graphical background means having a selected point of origin;
means for imposing at least a first circle on said graphical background, said first circle passing through said selected point of origin on said graphical background, and said first circle being tangent to a selected line passing through said point of origin; and
means for superimposing at least a second circle on said graphical background, said second circle passing through said selected origin point, and said second circle being tangent to a second selected line passing through said point of origin.

2. The apparatus of claim 1 further comprising:
means for displaying a graphical background in a reference plane, at least said first circle being superimposed on said graphical background by being displayed in a plane parallel to said reference plane.

3. The apparatus of claim 2 wherein said of said circle superimposing means comprises:
a transparent scale, said scale having indicia imprinted thereon in the form of a family of circles of differing radii, said circles all being tangent to a common point.

4. The apparatus of claim 2 wherein said each of said circle superimposing means comprises:
circle generator means; and
means for displaying the circle generated by said generating means in the reference plane.

5. The apparatus of claim 4 wherein said circle generating means comprises:
means for forming a circular image; and
means for adjusting the position of the image with relation to the reference plane.

6. The apparatus of claim 5 wherein said displaying means comprises:
means for projecting the circular image provided by said image forming means on the reference plane.

7. The apparatus of claim 1 wherein each of said circle superimposing means comprises:
a transparent scale, said scale having indicia imprinted thereon in the form of a family of circles of differing radii, said circles all being tangent to a common point.

8. The apparatus of claim 7 further comprising:
means interconnecting said scales at the points of tangency of the families of circles imprinted thereon, said scales being separately pivotable about said interconnecting means.

9. The apparatus of claim 8 further comprising:
means interconnecting said scales at the points of tangency of the families of circles imprinted thereon, said scales being separately pivotable about said interconnecting means.

10. The apparatus of claim 9 wherein said interconnecting means comprises:
pivot means passing through said scales, said pivot means including means for affixing said interconnected scales to said reference plane at the point of origin of the graph whereby said scales will be parallel to said reference plane and pivotable about the point of origin.

11. The apparatus of claim 8 wherein said interconnecting means comprises:
pivot means passing through said scales, said pivot means including means for fixing the position of said interconnected scales with relation to the graphical background.

12. The apparatus of claim 11 further comprising:

at least one additional transparent scale pivotably connected to said other scales by said pivot means, said additional scale having a family of circles with a common point of tangency imprinted thereon, the radii of the circles on said additional scale being different from the radii of the circles on either of the other scales, said pivot means passing through the point of tangency of the circles on said additional scale.

References Cited

UNITED STATES PATENTS 2,381,836 8/1945 Noble.
2,703,454 3/1955 Haywood.
3,134,297 5/1964 Carlson et al.
3,187,625 6/1965 Howell et al.
3,244,064 4/1966 Wilson et al.

OTHER REFERENCES

Electronic Engineering, September 1952, pages 426, 427, 428, "The Resolution of Complex Quantities." 235-61B.

WILLIAM D. MARTIN, Jr., *Primary Examiner.*

U.S. Cl. X.R.

235—89